United States Patent
Share et al.

(10) Patent No.: US 6,933,055 B2
(45) Date of Patent: Aug. 23, 2005

(54) MULTILAYERED PACKAGE WITH BARRIER PROPERTIES

(75) Inventors: Paul E. Share, Wexford, PA (US); Keith R. Pillage, Pittsburgh, PA (US)

(73) Assignee: Valspar Sourcing, Inc., Minneapolis, MN (US)

( * ) Notice: Subject to any disclaimer, the term of this patent is extended or adjusted under 35 U.S.C. 154(b) by 170 days.

(21) Appl. No.: 10/215,365

(22) Filed: Aug. 7, 2002

(65) Prior Publication Data

US 2003/0039779 A1 Feb. 27, 2003

Related U.S. Application Data

(63) Continuation-in-part of application No. PCT/US01/45254, filed on Oct. 31, 2001
(60) Provisional application No. 60/246,834, filed on Nov. 8, 2000, and provisional application No. 60/273,610, filed on Mar. 6, 2001.

(30) Foreign Application Priority Data

Oct. 31, 2001 (WO) ............................... PCT/US01/46050

(51) Int. Cl.[7] ........................ B32B 27/08; B32B 27/34; B65D 23/00; B65D 23/02; B65D 23/08
(52) U.S. Cl. .............................. 428/474.4; 428/475.2; 428/542.8; 428/36.7; 428/36.6; 428/36.91; 215/12.2
(58) Field of Search .............................. 428/35.7, 36.6, 428/30.7, 36.9, 36.91, 475.2, 480, 542.8, 474.4; 215/12.1, 12.2

(56) References Cited

U.S. PATENT DOCUMENTS

| | | | |
|---|---|---|---|
| 4,284,671 A | | 8/1981 | Cancio et al. |
| 4,501,781 A | * | 2/1985 | Kushida et al. ............ 215/12.2 |
| 4,764,403 A | | 8/1988 | Ajmera |
| 4,952,628 A | | 8/1990 | Blatz |
| 4,971,864 A | | 11/1990 | McCord |
| 5,034,252 A | | 7/1991 | Nilsson et al. |
| 5,069,946 A | | 12/1991 | Moritani et al. |
| 5,077,111 A | * | 12/1991 | Collette ..................... 428/36.7 |
| 5,110,855 A | | 5/1992 | Blatz |
| 5,194,306 A | | 3/1993 | Blatz |
| 5,281,360 A | | 1/1994 | Hong et al. |
| 5,641,825 A | | 6/1997 | Bacskai et al. |
| 5,759,653 A | | 6/1998 | Collette et al. |
| 2002/0022099 A1 | * | 2/2002 | Schmidt et al. ............ 428/35.7 |

FOREIGN PATENT DOCUMENTS

| | | |
|---|---|---|
| EP | 0 191 701 A2 | 8/1986 |
| WO | WO 95/11801 | 5/1995 |

* cited by examiner

Primary Examiner—Michael C. Miggins
(74) Attorney, Agent, or Firm—Shumaker & Sieffert PA

(57) ABSTRACT

The present invention provides compositions useful as a barrier layer in, for example, packaging products. The compositions generally comprise a blend of (i) a polyester resin, preferably an aromatic polyester resin such as polyethylene terephthalate (PET) and (ii) a polyamide material (e.g., MXD6). The blend optionally may further comprise (iii) an oxygen scavenging material. The present invention also provides containers (e.g., containers formed by expansion of preforms) having a multilayered body-forming portion including: a layer comprising the aforementioned blend; and one or more layers of a formable polymer composition. The present invention also provides methods of making such containers.

15 Claims, 3 Drawing Sheets

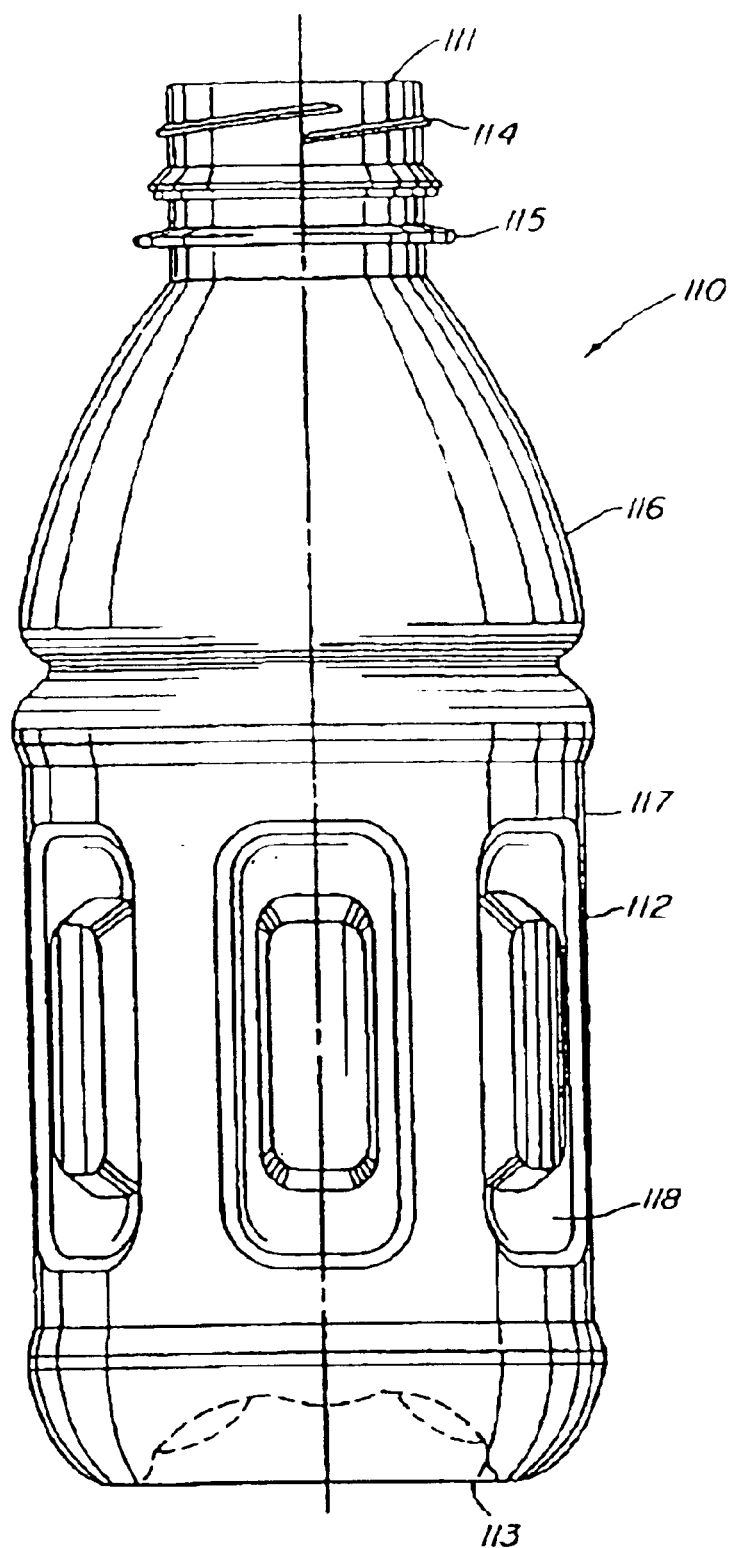
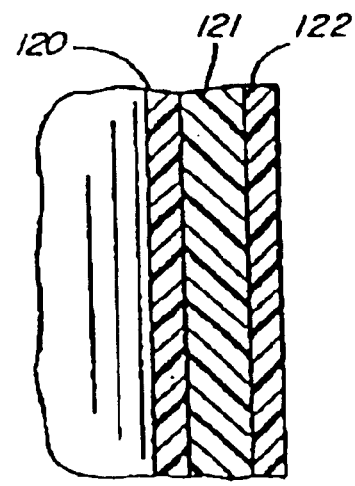
Fig. 3
Fig. 4

MULTILAYERED PACKAGE WITH BARRIER PROPERTIES

RELATED APPLICATIONS

This application is a Continuation-In-Part of PCT/US01/145254 Oct. 31, 2001 which claims benefit of 60/246,834 Nov. 8, 2000 and claims benefit of 60/273,610 Mar. 6, 2001 and PCT/US01/46050, filed on Oct. 31, 2001.

TECHNICAL FIELD

Within the packaging industry, there is a progressive change towards the use of containers of plastic material. This relates to both containers for beverages, including carbonated beverages, and containers for foods. As far as foods are concerned, there is an express desire in the art also to be able to employ containers of plastic material for the storage of preserved foods. In all of these fields of application, the insufficient barrier properties of the plastic material—and in particular its insufficient capacity to prevent the passage of gases, for example oxygen and $CO_2$, vaporized liquids such as water vapor etc. entail that the shelf-life and durability of the products stored in the containers will be far too short.

A number of proposals have been put forward in the art to solve the above problem, but the proposed techniques have failed to meet established demands of cost in combination with barrier properties in order that containers of plastic material may successfully be employed within the above-outlined sectors. Examples of solutions proposed in the art include:

laminates in which two or more layers of plastic material are combined with one another and in which the material in each layer possesses properties which entail that, for instance, gas penetration, light penetration or moisture penetration are reduced;

constructions in which, for example, a metal such as aluminum is encapsulated between the plastic materials or, for instance, forms the inner surface of the container; and constructions in which a barrier material other than metal is applied interiorly or in layers between the plastic material.

Solutions are also known in the art in which plastic materials of different types are mixed and thereafter molded to form containers. Thus, for example, it is previously known to produce containers of plastic material in which the plastic material consists of a mixture of PET and polyamide. See, e.g., U.S. Pat. Nos. 5,034,252; 5,281,360; 5,641,825; and 5,759,653. Unfortunately, these attempts have yielded commercially unsatisfactory results, for example, poor layer-to-layer lamination strength.

From the foregoing, it will be appreciated that what is needed in the art is improved plastic containers having even greater barrier properties for gases such as oxygen and $CO_2$. Such containers and materials and methods for preparing the same are disclosed and claimed herein.

SUMMARY

The present invention relates to compositions useful as a barrier layer in, for example, packaging products. The compositions generally comprise a blend of (i) a polyester resin, preferably an aromatic polyester resin such as polyethylene terephthalate (PET) and (ii) a polyamide material (e.g., MXD6). The blend optionally may further comprise (iii) an oxygen scavenging material.

The present invention also relates to containers (e.g, containers formed by expansion of preforms) having a multilayered body-forming portion including: a core layer comprising the aforementioned blend; and inner and outer layers of a formable polymer composition. The present invention also relates to methods of making such containers.

DESCRIPTION OF DRAWINGS

FIG. 3 is an elevational view of a three-layer hot-fill container according to this invention;

FIG. 4 is an enlarged fragmentary sectional view taken through the sidewall of the container of FIG. 3, showing the three-layers;

Like reference symbols in the various drawings indicate like elements.

DETAILED DESCRIPTION

Figure 1:
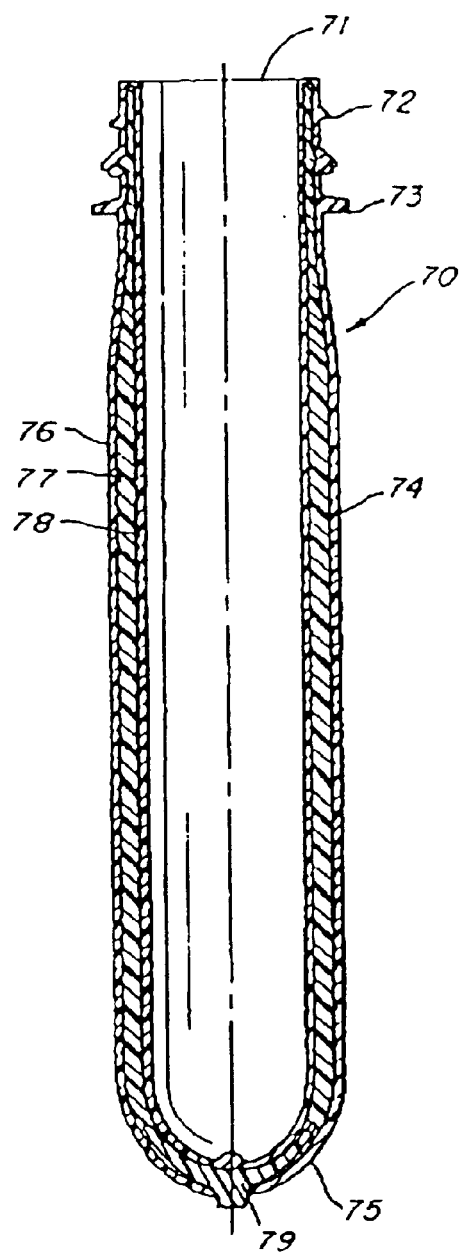
FIG. 1 is a cross-sectional view of a three-layer preform according to this invention.

In one embodiment, the present invention relates to compositions useful as a barrier layer in, for example, packaging products. The compositions of this embodiment generally comprise a blend of (i) a polyester resin, preferably an aromatic polyester resin such as polyethylene terephthalate (PET) and (ii) a polyamide material. The blend optionally may further comprise (iii) an oxygen scavenging material.

The blend suitably comprises a formable polyester. Suitable formable polyesters for use in the present invention include PET (e.g., virgin bottle grade PET, post-consumer PET (PC-PET), etc.), cyclohexane dimethanol/PET copolymer (PETG), polyethylene naphthalate (PEN), polybutylene terephthalate (PBT), etc.

Phthalic acid polyesters based on terephthalic or isophthalic acid are commercially available and convenient. Suitable hydroxy compounds for these polymers typically includes ethylene glycol, propylene glycol, butylene glycol and 1,4-di-(hydroxy methyl)cyclohexane.

Suitable polyesters for use in the present invention typically have an intrinsic viscosity in the range of 0.6 to 1.2, and more particularly 0.7 to 1.0 (for a 60/40 blend of phenol/tetrachloroethane solvent). For PET an intrinsic viscosity value of 0.6 corresponds approximately to a viscosity average molecular weight of 36,000, and an intrinsic viscosity value of 1.2 to a viscosity average molecular weight of 103,000.

In general, suitable polyesters may include polymer linkages, side chains, and end groups not related to the formal precursors of the simple polyesters previously specified.

The blend also suitably comprises a polyamide material. Both aromatic and aliphatic polyamides can be used. Copolymers of polyamides and other polymers may also be used.

A preferred aromatic polyamide is a polymer formed by polymerizing metaxylylenediamine ($H_2NCH_2$-m-$C_6H_4$—$CH_2NH_2$) with adipic acid ($HO_2C(CH_2)_4CO_2H$), for example a product manufactured and sold by Mitsubishi Chemicals, Japan, under the designation MXD-6 (e.g., grades 6001 and 6007).

Other suitable polyamides include, for example, nylon (e.g., nylon-6,6), GRIVORY (e.g., GRIVORY G16, G21, which are copolyamides having both linear aliphatic units and ring-like aromatic components, available from EMS-Chemie Inc.) and VERSAMID (an aliphatic polyamide typically used as an ink resin and available from Cognis Corporation).

The proportion of polyamide in relation to polyester can be varied mainly in view of the intended use of the container.

In one embodiment of the present invention, the composition comprises a blend of a polyethylene terephthalate material and a polyamide material, wherein the blend preferably comprises less than 70% by weight polyethylene terephthalate material. For this embodiment, the blend more preferably comprises between 10 and 70% by weight polyethylene terephthalate material, and most preferably between 20 and 60% by weight polyethylene terephthalate material. Also for this embodiment, the blend preferably comprises more than 20% by weight of the polyamide material, more preferably between 30 and 60% by weight polyamide material, and most preferably between 40 and 55% by weight polyamide material.

In another embodiment of the present invention, the composition comprises a blend of a polyester and a polyamide, wherein the blend preferably comprises more than 30% by weight polyamide material. For this embodiment, the blend preferably comprises more than 30% by weight polyester, more preferably between 40 and 70% by weight polyester, and most preferably between 45 and 70% by weight polyester. Also for this embodiment, the blend more preferably comprises between 30 and 60% by weight polyamide material, and most preferably between 40 and 55% by weight polyamide material.

If desired, the blend may optionally also suitably comprise an oxygen scavenging material. While not intending to be bound by theory, it is believed that suitable oxygen scavenging materials form active metal complexes having capacity to bond with oxygen. In this manner, it is believed that the oxygen scavenging material can confer higher oxygen barrier properties to the composition.

A broad variety of metallic and organic compounds are believed to be effective in providing the oxygen scavenging effect, and an appropriate compound may be selected based on cost and compatibility with the polymers of the blend. A preferred embodiment is a transition metal or a complex of metals selected from the first, second and third transition series of the periodic table, such as iron, cobalt, nickel, ruthenium, rhodium, palladium, osmium, iridium, and platinum. In another preferred embodiment, the metal compound comprises copper, manganese, or zinc. Suitable oxygen scavenging materials for use in this invention include: aluminum powder; aluminum carbide; aluminum chloride; cobalt powder; cobalt oxide; cobalt chloride; antimony powder; antimony oxide; antimony tri-acetate; antimony chloride III; antimony chloride V; iron; electrolytic iron; iron oxide; platinum; platinum on alumina; palladium; palladium on alumina; ruthenium; rhodium; copper; copper oxide; nickel, and mixed metal nanoparticles (e.g., cobalt iron oxide nanoparticles). Suitable nanoparticles have an average particle size of less than about 200 nm, preferably less than about 100 nm, and more preferably between 5 and 50 nm.

While not intending to be bound by theory, it is presently believed that one possible advantage mixed metal nanoparticles might have is that cobalt ferrite undergoes an internal charge transfer from cobalt to iron under the illumination of a tungsten halogen lamp. As part of the commercial bottle blowing process, preforms are sometimes heated under direct irradiation of quartz halogen lamps. Although cobalt ferrite-type scavengers may absorb oxygen upon formation with the polyamide, it is anticipated that the scavenging activity would be substantially increased as a result of the intense illumination during bottle formation. In addition, cobalt ferrite nanoparticles are prepared as a nanocrystalline material. It is expected that the nanometer scale of the particles may render them suitable for use in colorless, optically transparent containers, and that their crystalline structure would give rise to higher activity than solution salts of the same ions.

One skilled in the art can determine without much difficulty which concentration is appropriate in each blend, but in general it will be a range of 50–10,000 ppm by weight, and more preferably 50–1,000 ppm. The upper limit is dictated by factors such as economy, toxicity, clarity and color.

There are numerous multilayer preform and container constructions possible, each of which may be adapted for a particular product and/or manufacturing process. A few representative examples will be given.

A suitable three-layer construction comprises a core barrier layer disposed between inner and outer layers. For example, the three-layer sidewall construction may comprise inner and outer layers of PET (e.g., substantially virgin PET); and a core layer including a blend of (i) one or more polyesters (e.g., PET, PC-PET, PETG, PEN, PBT), (ii) one or more polyamides (e.g., MXD-6), and (iii) optionally one or more oxygen scavenging materials (e.g., cobalt).

A suitable five-layer structure may have relatively thin inner and outer intermediate layers to provide high oxygen barrier properties without loss of clarity. Relatively thicker inner and outer layers of PET would provide the necessary strength and clarity. A thin core layer as described above provides the necessary barrier effect at a competitive price and with accelerated activation. Suitable inner and outer intermediate layers for this embodiment may comprise oxygen barrier layers such as EVOH, PEN, polyvinyldene chloride (PVDC), nylon 6, MXD-6, LCP (liquid crystal polymer), amorphous nylon, polyacrylonitrile (PAN), styrene acrylonitrile (SAN), and active scavengers such as AMOSORB from BP/AMOCO.

An alternative five-layer structure may have inner and outer layers of PET, inner and outer intermediate layers of PC-PET, and a thin core layer as described above. The advantage of this embodiment is that the PC-PET may be effectively encapsulated in the bottle and not come in direct contact with the product or the user.

In preferred embodiments, the core layer has a thickness of between about 1 and 10, more preferably between about 2 and 8, and most preferably between about 3 and 6 percent of the total wall thickness.

The container of the present invention may be used to provide good gas (e.g., oxygen and/or $CO_2$) barrier properties for products such as carbonated soft drinks. It is particularly useful in packaging products such as beer, because beer rapidly loses its flavor due to oxygen migration into the bottle. This is also true for products such as citrus products, tomato-based products, and aseptically packaged meat.

In preferred embodiments, the blends of the present invention, when formed into three-layer (PET-Blend-PET), ten-ounce (295 ml) beverage bottles having a total wall thickness of 0.051 cm and a core layer of 5% of the total wall thickness, exhibit less than 15% loss of $CO_2$, when tested as described in Examples 1–3, over a 7.5 week period. More preferably the loss of $CO_2$ over that same period is less than 12% and most preferably is less than 10%.

In preferred embodiments, the blends of the present invention, when formed into three-layer (PET-Blend-PET), ten-ounce (295 ml) beverage bottles having a total wall thickness of 0.051 cm and a core layer of 5% of the total wall thickness, exhibit less than 0.02 cc/pkg/day transmission of $O_2$, when tested as described in Examples 1–3. More preferably the transmission of $O_2$ over that same period is less than 0.01 cc/pkg/day, and most preferably is less than 0.005 cc/pkg/day.

In preferred embodiments, the blends of the present invention, when formed into multi-layer bottles, have superior layer-to-layer lamination strength to formable polymers when compared to barrier materials used in conventional multi-layer bottles having reduced permeability. It is a surprising discovery that such superior layer-to-layer lamination strengths have been achieved while not negatively impacting the bottle's barrier properties. As used herein, the term "superior layer-to-layer lamination strength" means that adjacent layers of a multi-layered bottle have sufficient layer-to-layer lamination strength to withstand typical stresses that such bottles experience in normal production, filling, storage and handling without appreciable amounts of delamination. While not intending to be bound by theory, it is presently believed that the blends of the present invention achieve such superior layer-to-layer lamination strength as a result of the compatibility of certain components of the layers. For example, a presently preferred three-layer bottle comprises inner and outer PET layers with an intermediate layer comprising a blend containing PET. It is believed that having at least 10 weight percent (more preferably at least 20 weight %, and most preferably at least 30 weight %) PET in the intermediate layer of such bottles contributes to the surprisingly good layer-to-layer lamination strength.

Preferred multi-layered constructions, when formed into 473 ml (16 ounce) bottles, have sufficient layer-to-layer lamination strength to allow a full bottle to withstand (or substantially withstand) a drop of 46 cm (18 inches) without appreciable delamination. More preferred bottles withstand a drop of over 1.2 m (4 feet), optimally over 1.8 m (6 feet) without appreciable delamination. More preferred bottles are also capable of being stacked in a vending machine and dispensed without appreciable delamination. Notably, certain conventional multi-layered bottles have exhibited significant amounts of delamination under these stresses. Delaminated bottles are both esthetically unpleasing and structurally flawed.

Figure 2:
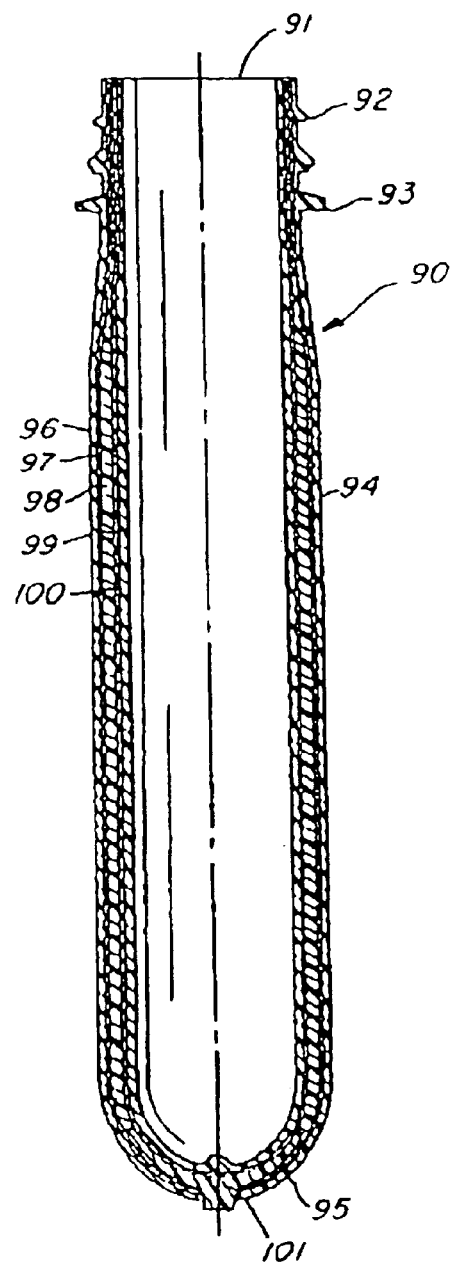
FIG. 2 is a cross-sectional view of a five-layer preform according to this invention.

FIGS. 1–2 show two alternative multi-layer preform structures, and FIGS. 3–6 show two alternative container structures, useful in the present invention.

FIG. 1 shows a substantially amorphous and transparent three-layer preform 70 having an open upper end 71 with a neck finish including outer threads 72 and a cylindrical flange 73. Below the neck flange there is a substantially cylindrical body portion 74, terminating in a closed hemispherical bottom end 75.

The three-layer sidewall construction includes outer layer 76, core layer 77, and inner layer 78. By way of example, the inner and outer (exterior) layers (78 and 76) may be virgin bottle grade PET, while the core layer 77 comprises the blend composition of this invention. In a lower base-forming portion of the preform, a five-layer structure may optionally be formed by a last shot of virgin PET that clears the injection nozzle of the blend composition (so it is filled with virgin PET for preparation of the next preform). The last shot 79 of virgin PET forms a five-layer structure around the gate, and in this case the virgin PET extends through to the exterior of the preform at the gate region. The dimensions and wall thicknesses of the preform shown in FIG. 1 are not to scale. Any number of different preform constructions may be used.

FIGS. 3–4 show a representative three-layer, container that may be blow molded from a preform similar to that shown in FIG. 1. The container 110 includes an open top end 111, substantially cylindrical sidewall 112, and closed bottom end 113. The container includes the same neck finish 114 and flange 115 of the preform, which are not expanded during blow molding. The sidewall includes an expanded shoulder portion 116 increasing in diameter to a cylindrical panel portion 117, which includes a plurality of vertically-elongated, symmetrically-disposed vacuum panels 118. The vacuum panels are designed to move inwardly to alleviate the vacuum formed during product cooling in the sealed container. Again, this container construction is by way of example only and the invention is not limited to any particular package structure. FIG. 4 shows the three-layer sidewall construction including inner layer 120, core layer 121, and outer layer 122. By way of example, the inner and outer layers (120 and 122) may be virgin bottle grade PET, while the core layer 121 is made of the blend composition of this invention.

FIG. 2 shows an alternative five-layer preform 90. Again, the preform includes an open upper end 91, neck finish with threads 92 and flange 93, and body-forming portion 94 with a closed bottom end 95. The five-layer sidewall construction includes outer layer 96, first intermediate layer 97, core layer 98, second intermediate layer 99, and inner layer 100, disposed in serial order. By way of example, the inner and outer layers 96 and 100 may be virgin bottle grade PET, while the intermediate layers 97 and 99 are a PC-PET material or a high oxygen barrier material such as EVOH, and the core layer 98 is made of the blend composition of this invention. Again in the base, there optionally may be a last shot of virgin PET 101 to clear the nozzle.

Figure 5:
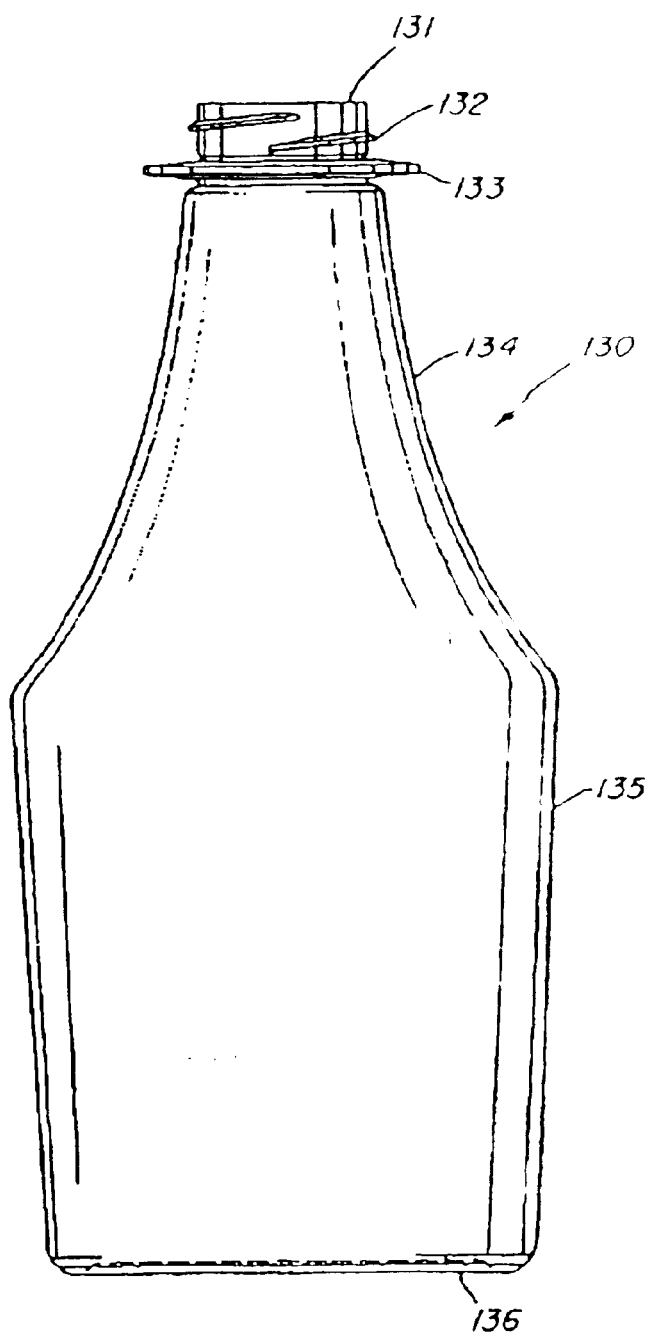
FIG. 5 is an elevational view of a five-layer ketchup container according to this invention.
Figure 6:
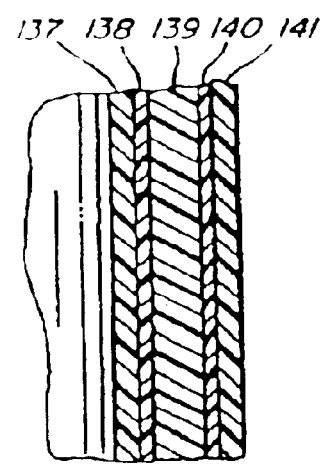
FIG. 6 is an enlarged fragmentary sectional view taken through the sidewall of the container of FIG. 5, showing the five layers.

FIGS. 5–6 show a representative ketchup container that may be blow molded from a five-layer preform similar to that of FIG. 2. Again, the details of the preform and container construction are not critical, and variations may be required to the preform construction in order to blow mold the container of FIG. 5. The ketchup container 130 includes an open top end 131, neck finish 132 with neck flange 133, a shoulder portion 134 increasing in diameter, and a panel portion 135 connecting to a base 136. The five-layer sidewall construction, as shown in FIG. 6, includes an inner layer 137, first intermediate layer 138, core layer 139, second intermediate layer 140, and outer layer 141. By way of example, the inner and outer layers 137 and 141 may be virgin bottle grade PET, the core layer may be the blend composition of the present invention, and the intermediate layers 138 and 140 may be a PC-PET material or a high oxygen barrier material such as EVOH.

Several different methods are practiced to make the containers of the present invention.

In one method, a multilayered container is prepared by: (i) providing a core layer blend material of the present invention; (ii) providing an inner and outer layer material of a suitable formable polymer; (iii) co-injecting the core layer blend material and the inner and outer layer materials to form a multilayered preform; and (iv) heating and expanding the preform to form a container.

In an alternative method, a multilayered container is prepared by: (i) providing a core layer blend material of the present invention; (ii) providing an inner and outer layer material of a suitable formable polymer; (iii) extruding a multilayer parison tube having inner and outer layers of a suitable formable polymer and a core layer blend material of the present invention; (iv) clamping the parison tube into a hollow cavity mold; (v) blowing the parison against the cavity; and (vi) trimming the molded container.

In yet an alternative method (the "over-injected parison" method), a multilayered container is prepared by: (i) providing a core layer blend material of the present invention; (ii) providing an inner and outer layer material of a suitable formable polymer; (iii) extruding a multilayer parison tube having inner and outer layers of a suitable formable polymer and a core layer blend material of the present invention; (iv) injecting one or more additional layers of polymer over the parison; (v) clamping the over-injected parison tube into a hollow cavity mold; (vi) blowing the over-injected parison against the cavity; and (vii) optionally trimming the molded container.

In yet another method (called "IOI"), a multilayered container is prepared by: (i) providing a blend material of the present invention; (ii) providing a material of a suitable formable polymer; (iii) injecting the blend material to form a preform; (iv) injecting a layer of formable polymer against the preform (e.g., on the outside surface); and (v) heating and expanding the preform to form a container.

The following examples are offered to aid in understanding of the present invention and are not to be construed as limiting the scope thereof. Unless otherwise indicated, all parts and percentages are by weight.

EXAMPLES

Examples 1–3

Examples 1–3 illustrate the barrier properties of various multilayer containers. Ten-ounce (295 ml) carbonated soft drink (CSD) preforms were coinjected in an Arburg press fitted with a Kortec coinjection unit and stretch blowmolded in a Sidel blowmolding unit.

For the core layer of the preforms, the materials listed in Table 1 were blended at 275–280° C. at 100 rpm in a twin screw extruder model ZSK-25 manufactured by the Werner and Pfleiderer Corporation and pelletized under air cooling. For each formula, approximately 4.5 to 6.8 kg of resin was blended. The PET, PEN, and MXD6 materials used were dried prior to use in a Conair drier at 121° C.

Twenty to fifty preforms were injected and stretch blow-molded. Each preform had a core layer of the composition described in Table 1 and an inner and an outer layer of PET. The thickness of the core layer was about 5% of the total container wall thickness of 0.051 cm.

Examples C1 and C2 were included for comparison purposes.

TABLE 1

Composition of Materials

| Example | PET[1] wt % | MXD6[2] wt % | PEN[3] wt % | Cobalt[4] wt % |
|---|---|---|---|---|
| 1 | 46.00 | 53.95 | | 0.05 |
| 2 | 46.00 | 54.00 | | |
| 3 | 50.00 | 25.00 | 25.00 | |
| C1 | 100.00 | | | |
| C2 | | 100.00 | | |

[1]Eastapak 9663 PET was used as supplied by Eastman Chemical
[2]MXD6 Grade 6007 was used as supplied by the Mitsubishi Gas Corporation
[3]Hypertuf 92004 PEN was used as supplied by Shell Chemical
[4]Cobalt Neodecanoate was used as supplied by OMG Americas $CO_2$ transmission measurements were performed on a computer controlled pressure measurement system. The bottles were threaded into a gas manifold and charged with 4 atmospheres of $CO_2$ gas and maintained at ambient temperature and humidity for the 7½ week period. Each bottle under test is monitored with an independent pressure transducer, and the pressure is periodically measured and recorded by an automated data acquisition program.

$O_2$ transmission measurements were performed on a Mocon Oxtran 2/20 Model ML and SM that was adapted for use with 10 oz (295 ml) bottles, and were carried out at ambient temperature and humidity. Bottles were conditioned for 24 to 48 hours prior to each measurement.

TABLE 2

Permeability—10 oz containers

| Example | % $CO_2$ Loss | $O_2$ Transmission (cc/pkg/day) |
|---|---|---|
| 1 | Not tested | 0.0021 |
| 2 | 7.7 | 0.0096 |
| 3 | 11.1 | 0.0168 |
| C1 | 24.7 | 0.0296 |
| C2 | 7.0 | 0.0085 |

The $O_2$ transmission rate determined for Examples 1 and 2 were identical immediately after the bottles were produced. After approximately 30 days at ambient temperature and humidity, the scavenging effect of Example 1 reduced the $O_2$ transmission rate to the minimum sensitivity level for the Mocon ML system.

As is evident from the data in Table 2, the blends exhibited both $O_2$ and $CO_2$ barrier performance that was significantly higher than would have been expected based upon the proportion of MXD6 alone. In the case of Example 1, the $O_2$ permeability differed from the neat barrier material by 13 percent, whereas the proportion of MXD6 differed by a factor of about 2. The 295 ml bottles of Examples 1–3 also exhibited acceptable lamination strength for their intended use.

It has been discovered that bottle design and moisture and/or humidity conditioning can influence the onset of $O_2$ scavenging effect. Sixteen-ounce (473 ml) heat set bottles (weighing 38 g) having the general construction indicated above were tested for $O_2$ transmission as outlined above except the bottles were conditioned prior to testing as described below.

TABLE 2b

Permeability—473 ml (16 oz) containers

| Example | Storage Condition Prior to Testing | $O_2$ Transmission (cc/pkg/day) |
|---|---|---|
| 1 | 24 hours at ambient temperature and humidity | 0.012 |
| 1 | Filled with coldwater for 5 minutes, drained and then tested | 0.00036 |
| 1 | 5 weeks at ambient temperature and humidity | 0.025 |
| 1 | 5 weeks at ambient temperature and humidity then pasteurized at 82° C. for 5 minutes | 0.002 |
| C1 | 24 hours at ambient temperature and humidity | 0.04 |

As can be seen moisture is a factor that strongly influences how quickly the oxygen scavenging effect is observed.

A BRUCETON Staircase drop test was conducted on filled sixteen-ounce (473 ml) heat set bottles (weighing 38 g). These bottles were manufactured using the "over-injected parison" method and hot filled at 183° F. (84° C.). When blown the bottles had 4 layers of material (i.e., the inner three layers were initially formed with the parison and the outer layer was over-injected). From inside to outside a cross-section of the bottles had the following layers (parts by weight): PET (4 parts)//Ex. 1 blend (4 parts)//PET (4 parts)//PET (88 parts).

The BRUCETON staircase method involves dropping filled bottles a predetermined distance and observing whether the bottle exhibited any delamination. 20 bottles were used in this test. All 20 bottles were tested from a height of 45.7 cm (18 inches) and passed the test (i.e., no visible delamination). The bottles were then tested from higher heights (1.2 m, 1.5 m, 1.8 m, 2.1 m). Each bottle was tested once. If the bottle passed the next bottle was tested from the next higher height. If that bottle passed the next bottle was tested at the next higher height, etc. If a bottle failed the height was reduced for the next bottle, etc.

Table 2C illustrates the results for this test

TABLE 2C

BRUCETON STAIRCASE DROP TEST

| Bottle # | Drop Height | | | |
|---|---|---|---|---|
| | 1.2 m (4 ft.) | 1.5 m (5 ft.) | 1.8 m (6 ft.) | 2.1 m (7 ft.) |
| A | 1 | | | |
| B | | 1 | | |
| C | | | 1 | |
| D | | | | 0 |
| E | | | 1 | |
| F | | | | 0 |
| G | | | 1 | |
| H | | | | 0 |
| I | | | 1 | |
| J | | | | 1 |
| K | | | | 1 |
| L | | | | 0 |
| M | | | 1 | |
| N | | | | 0 |
| O | | | 0 | |
| P | | 1 | | |
| Q | | | 1 | |
| R | | | 0 | |
| S | | | 1 | |
| T | | | | 0 |

1 = pass; 0 = fail

As can be seen from the above data the bottles of the present invention exhibited excellent lamination strength. A control bottle having a pure MXD6 barrier layer would typically exhibit failure at about 25 to 30 cm (10 to 12 inches) drop. All the above bottles passed at 1.2 m (4 ft.) and an average failure height of greater than 1.8 m (6 ft.) was observed.

Examples 4–6

Examples 4–6 illustrate other blends that are believed to be suitable for use in the preforms and containers of the present invention.

TABLE 3

Composition of Materials

| Sample | PET[1] wt % | 6001-MXD6[2] wt % | 6007-MXD6[3] wt % | HDPE[4] wt % |
|---|---|---|---|---|
| 4 | 65 | 15 | | 20 |
| 5 | 60 | | 30 | 10 |
| 6 | 60 | 30 | | 10 |

[1] Eastapak 9663 PET was used as supplied by Eastman Chemical
[2] MXD6 Grade 6001 was used as supplied by the Mitsubishi Gas Corporation
[3] MXD6 Grade 6001 was used as supplied by the Mitsubishi Gas Corporation
[4] Exxon Escorene HDPE was used as supplied by Exxon.

Example 7

Preparation of Cobalt Ferrite Nanoparticles

A solution of 5.40 g $FeCl_3.6H_2O$ and 2.38 g $CoCl_2.6H_2O$ in 200 ml HPLC grade $H_2O$ was prepared and added dropwise over a period of 5 minutes to a stirred solution of 8.0 g NaOH in HPLC grade $H_2O$ at ambient temperature. The resulting brown precipitate and solution were covered with a watch glass and heated to boiling for one hour. The solution was cooled to ambient temperature, the supernatant solution was poured from the black precipitate, and the precipitate was washed once with water. The cobalt ferrite was annealed for 24 hours at 250° C. in an oven, and the resulting black solid was crushed to a fine powder in a mortar and pestle.

Example 8

3.78 g of Cobalt Ferrite was mixed vigorously with 5.4 kg Eastman Eastapak 9663 PET which had been previously dried in a Conair Dryer. To this mixture was added 2.72 kg Mitsubishi MXD6 6001 and 0.9 kg Exxon Escorene 6704 HDPE. The mixture was melt blended and pelletized in a Werner and Pfleiderer twin screw extruder at 275° C. at a rate of approximately 13.6 kg/hour. The resulting material was stored under nitrogen.

Having thus described the preferred embodiments of the present invention, those of skill in the art will readily appreciate that the teachings found herein may be applied to yet other embodiments within the scope of the claims hereto attached. The complete disclosure of all patents, patent documents, and publications are incorporated herein by reference as if individually incorporated.

What is claimed is:

1. A multi-layered container, comprising:
    a layer of a formable polymer; and
    a blend layer comprising a blend of:
        (i) between 10 and 60% by weight of a polyethylene terephthalate material,
        (ii) between 45 and 60% by weight of a polyamide material,
        (iii) 50 to 10,000 ppm of an oxygen scavenging material, and
    wherein said blend layer comprises between about 3 and 6 percent of the total wall thickness of the container and wherein the percent polyamide material in the entire container is between 1.35 and 3.6% by weight.

2. The container of claim 1, wherein the layer-to-layer lamination strength is sufficient such that a filled 473 ml bottle can withstand a drop of 46 cm without appreciable delamination.

3. The container of claim 1, wherein the layer-to-layer lamination strength is sufficient such that a filled 473 ml bottle can withstand a drop of 1.2 m without appreciable delamination.

4. The container of claim 1, wherein the blend comprises between 45 and 60% by weight PET.

5. The container of claim 1, wherein the blend comprises between 30 and 60% by weight MXD6.

6. The container of claim 1, wherein the blend comprises between 40 and 55% by weight of the polyamide material.

7. The container of claim 1, wherein the container, is a three-layer (PET-Blend-PET), 295 ml beverage bottle having a total wall thickness of 0.051 cm and a core layer of 5% of the total wall thickness, said container exhibits less than 15% loss of $CO_2$ over a 7.5 week period.

8. The container of claim 1, wherein the container, is a three-layer (PET-Blend-PET), 295 ml beverage bottle having a total wall thickness of 0.051 cm and a core layer of 5% of the total wall thickness, said container exhibits less than 0.02 cc/pkg/day transmission of $O_2$.

9. A preform for expansion into the container of claim 1.

10. The container of claim 1, wherein said blend layer comprises 50–1,000 ppm of an oxygen scavenging material.

11. The container of claim 1, wherein the formable polymer comprises a formable polyester which is selected from the group consisting of PET, PC-PET, PETG, PEN and PBT.

12. The container of claim 11, wherein the blend comprises between 20 and 60% by weight PET and wherein the polyamide comprises MXD6.

13. The container of claim 1, wherein the oxygen scavenging material forms active metal complexes having capacity to bond with oxygen for conferring high oxygen barrier properties to the composition.

14. The container of claim 13, wherein the oxygen scavenging material comprises cobalt.

15. The container of claim 13, wherein the oxygen scavenging material comprises mixed metal nanoparticles.

* * * * *

UNITED STATES PATENT AND TRADEMARK OFFICE
CERTIFICATE OF CORRECTION

PATENT NO.         : 6,933,055 B2
APPLICATION NO. : 10/215365
DATED              : August 23, 2005
INVENTOR(S)        : Paul E. Share and Keith R. Pillage Page 1 of 1

It is certified that error appears in the above-identified patent and that said Letters Patent is hereby corrected as shown below:

On Column 11, line 18 (claim 7), "hay" should read --hav--

Signed and Sealed this

Twenty-ninth Day of May, 2007

JON W. DUDAS
*Director of the United States Patent and Trademark Office*